United States Patent [19]

Usner

[11] Patent Number: 5,050,833
[45] Date of Patent: Sep. 24, 1991

[54] ANGLED ROLLER DEVICE FOR MULTIPLE GARMENT HANGER ROPE-SLING

[76] Inventor: Daniel C. Usner, 9535 Greystone Pkwy., Brecksville, Ohio 44141

[21] Appl. No.: 652,214

[22] Filed: Feb. 5, 1991

Related U.S. Application Data

[63] Continuation-in-part of Ser. No. 505,234, Apr. 5, 1990, abandoned.

[51] Int. Cl.$^5$ ............................................. B42F 13/00
[52] U.S. Cl. ..................................... 248/340; 248/214; 198/465.4
[58] Field of Search ................ 248/214, 340; 211/162; 198/465.4

[56] References Cited

U.S. PATENT DOCUMENTS

| | | | |
|---|---|---|---|
| 2,499,188 | 2/1950 | Freeman | 211/113 |
| 2,789,391 | 4/1957 | Perry | 248/214 |
| 2,842,329 | 7/1958 | Friedman et al. | 248/340 |
| 2,889,935 | 6/1959 | Thornburg | 248/340 |
| 2,936,076 | 5/1960 | Harris | 248/340 |
| 3,184,042 | 5/1965 | Rutkovsky et al. | 198/465.4 X |
| 3,912,214 | 10/1975 | Karass | 248/340 X |
| 3,921,814 | 11/1975 | Solomon | 211/124 X |
| 4,527,484 | 7/1985 | Veith et al. | 198/465.4 X |
| 4,606,430 | 8/1986 | Roby et al. | 248/214 X |

FOREIGN PATENT DOCUMENTS

| | | | |
|---|---|---|---|
| 559993 | 4/1957 | Belgium | 248/214 |
| 988788 | 4/1965 | United Kingdom | 198/465.4 |

*Primary Examiner*—Gary L. Smith
*Assistant Examiner*—Michael Milano
*Attorney, Agent, or Firm*—Milton Lawrence Simmons

[57] ABSTRACT

There is provided a garment rope gang-sling hook device characterized by said hook having disposed thereon three small, low-friction, ball or roller bearing, rollers having substantially flat rolling surfaces, disposed in fixed position on the crook of said hook, the axis of rotation of the centrally disposed roller forming an angle of between 30° and 89° with the axes of rotation of each flanking roller, respectively.

4 Claims, 1 Drawing Sheet

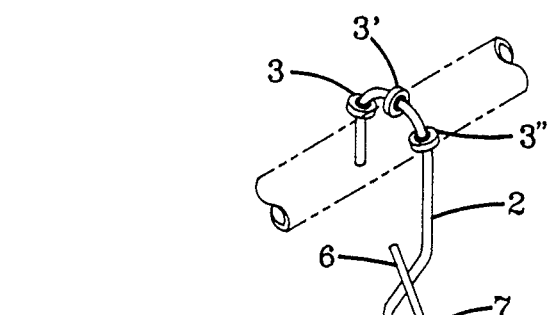
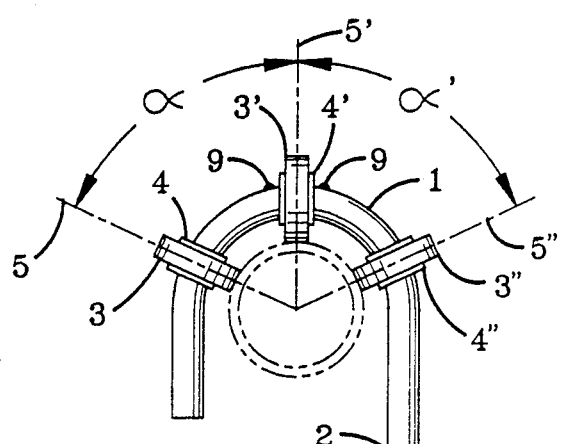
FIG-1
FIG-2
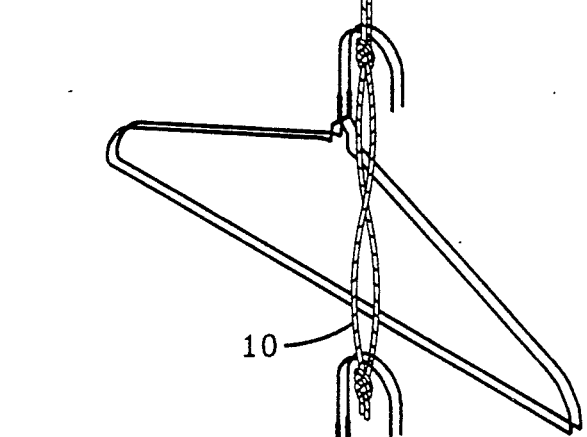
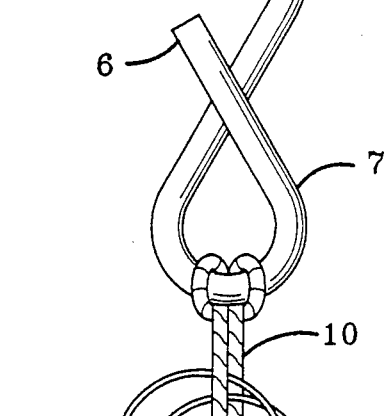
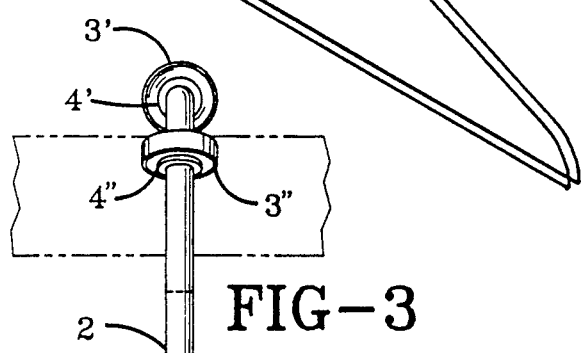
FIG-3
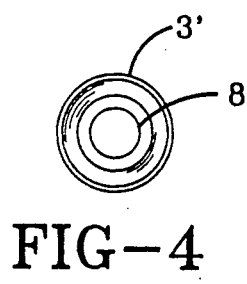
FIG-4
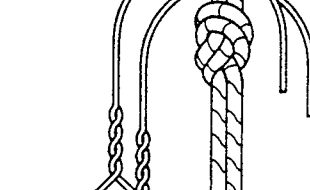
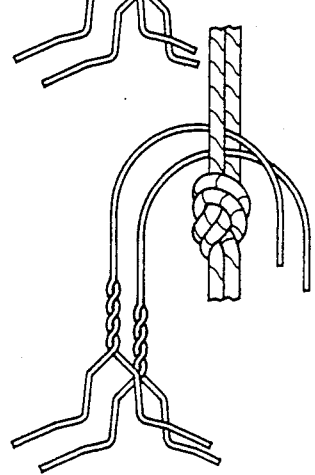

ANGLED ROLLER DEVICE FOR MULTIPLE GARMENT HANGER ROPE-SLING

In the garment trade, in transporting hanger-hung garments from wholesale to retail facilities, from consolidator to warehouse, from warehouse to sales floor, or simply from one storage point to another, it is the practice to expedite such transfer by hanging the garments on a trolley bar at an initial point, then transferring the garments from the trolley bar to either storage bars, or to hanging facilities in a truck for transporting said garments to a wholesale, retail or holding facility.

One of the major problems encountered in removing individual garment hangers from a garment trolley bar at a trolley terminus, situated on a loading or shipping dock, is that a great deal of hand labor and time is expended in transferring individual hanger-hung garments from a trolley bar, to either rope-slings, or to shipping bars horizontally fixed within the body of a shipping vehicle.

It has been found that time and shipping space can be much more efficiently utilized, if a number of vertical rope "gang" slings are used to store and ship garments, which slings may be suspended from the roof of the shipping vehicle, the slings being essentially looped, double rope, with a series of knots tied therein at approximately 25 cm. intervals. Anywhere from five to ten hanger-hung garments may be hooked into the gang-sling in the loop above a given knot. Ideally, the rope-sling, when utilized, may be lifted with its multiplicity of hanger-hung garments at each knot, at the shipping site, then hooked into appropriate ceiling-fixed hooks in the shipping vehicle.

The shipping vehicle may also be equipped with ceiling-mounted hanger or trolley bars, on which the individual rope-slings, with their multiplicity of garments, may be hung from conventional hooks. The initially hung rope-sling being pushed farther and farther toward the front of the vehicle as successive rope-slings, with their hanger-hung garments, are hung from the hanger bar at the rear of the vehicle during loading. It is essential, therefore, that friction be reduced to a minimum to enable the last hung sling to push those ahead of it.

Previously, due to the weight of each rope-sling with its load of hanger-hung garments, it became progressively more difficult to push successive, loaded rope-slings toward the front of the truck as loading progressed. Individual, large, single-pulley hook devices, as an aid to pushing the rope-slings to the front of the loading vehicle on the hanger bar, have been attempted, but they are extremely expensive, cumbersome, and require quite a bit of vertical space above the hanger bar in order to accommodate the relatively large, single-pulley mechanism. Furthermore, a large, single sheave or pulley, due to swaying of its load during transit, tends to "jump the track," so to speak, either falling to the floor of the vehicle, or jamming on the trolley bar so it cannot be readily moved.

Since reduction of friction is such a major consideration, a single grooved pulley or sheave, or a pair of them in tandem, provide unwanted drag. That is, a grooved sheave is in rolling contact with a trolley bar only at the very center of the grooved roller; the remainder of the grooved surface is literally in scraping or sliding contact with the surface of the trolley bar.

It has been found however, that if the rope-sling is hung from a fairly heavy gauge hanger hook fashioned from wire or narrow bar stock at least 5 mm. in diameter, having an arcuate crook therein, with three relatively small rollers, each affixed to said hook in just the right position, the rope-slings may be readily hung on a storage or shipping vehicle hanger or trolley bar, and easily pushed to the front of the shipping vehicle as successive rope-slings are placed upon the hanger bar.

Referring now to the drawings attached hereto, and made a part hereof:

FIG. 1 is a perspective view of the instant device with a conventional rope-sling suspended therefrom; and, FIG. 2 is an enlarged, front elevation view of the improvement represented by the instant invention; and FIG. 3 is a side view of the device of the instant invention.

FIG. 4 is a side view of one of the roller useful to the practice of this invention.

In essence, the instant invention is a major improvement over prior hanging devices, whereby each gang-sling now has its own hanging device made of fairly heavy-duty wire, with its curve coinciding generally to the curve of a shipping vehicle trolley or hanger bar, and having three relatively small rollers affixed thereto. The plane of rotation of the centrally disposed roller will coincide generally with the vertical axis of the rope-sling, when the device of this invention is in its normal position of repose depicted in the attached drawings. The outside diameters of the three rollers are substantially equal, and will vary within rather narrow limits from between twice the diameter of the heavy-gauge wire or bar stock forming the crook of the rope-sling hanger, to no more than seven times said wire diameter.

Because vertical space is at a premium, the highest point of the instant invention is the top surface of the central roller, the instant device being devoid of any structure above that point. Thus, the trolley bar can be mounted much closer to a ceiling when utilizing the instant device, thereby increasing the vertical span available for hanging more garments.

Trolley bars for garment storage and transfer are well known, and are typified by FIG. 3 of U.S. Pat. No. 3,921,814, incorporated herein by reference. The rail or trolley bar 50 is supported by "J" hooks 52. See FIG. 2, showing how rollers 16 are journaled in housing 15. If such a hanging device were pressed into service for use on a truck mounted trolley bar, the swaying and jostling in transport could easily dislodge the device disclosed, resulting in soiled garments. Furthermore, during movement along the trolley bar, any swaying from side to side would intermittently cause the device of the '814 patent to lose rolling contact by its rollers, and encounter scraping contact with either lip 18 or hook shank 14. Opposed to this drawback, the device of the instant invention can be laterally swung or swayed up to nearly 180°, and one or more of its three rollers will remain in supporting, rolling contact with the trolley bar. The '814 patent (FIGS. 1 and 3) shows well-known switching device 54, alluded to at Column 3, lines 30 to 34.

U.S. Pat. No. 3,283,914 discloses a trolley bar, roller-hook device having all the undesirable features of the '814 patent, besides which the rollers are never in true rolling contact with the trolley bar because their planes of rotation are not normal to a tangent of the trolley bar circular cross-section, at the point of contact of the rollers with the bar.

See also the devices disclosed by U.S. Pat. No. 2,499,188 and 2,834,475, which exhibit the same deficiencies as the above patents, which the instant invention overcomes.

It is therefore the object of this invention to provide a new, simplified and improved device and method for removably hanging, and transporting, rope slung garments on either truck or in-house mounted trolley bars.

Referring now specifically to the drawings, FIG. 1 depicts a rope-sling with hangers suspended from the instant device, which in turn rides on a phantom hanger or trolley bar. FIG. 2 is a front elevation view of FIG. 1, and FIG. 3 is a side elevation view of FIG. 1.

In the above FIGS. 1 to 3, 2 designates the device of this invention generally; reference numeral 1 depicts the arcuate hook of the rope-sling hanger. 3, 3' and 3" are rollers approximately 3.0 cm. in diameter which have been welded to hook 1 at points 4, 4' and 4" respectively.

Each roller 3, 3' and 3" is low-friction and rotatable about a fixed conventional hub, on either roller or ball bearings. Axes 5, 5' and 5" through each roller member respectively, represent the plane of their respective rotation. Each axis is therefore essentially normal to a tangent of the trolley bar at the point of contact of each roller with said bar. From FIG. 2, it will be seen that the rollers of this invention have essentially flat, or straight rolling surfaces, as opposed to grooved, and they are essentially of equal diameter. Consequently, each roller is always in pure rolling contact with the trolley bar regardless of the degree of swing or sway.

Another embodiment of this invention contemplates that rollers 3, 3' and 3", or any one of them, may be laterally slidable over a short range of from about 0.0 mm to about 9.0 mm. This may be accomplished by capturing a roller loosely between two, spaced-apart spot welds or swedged lugs 9 on hook 1, as shown in FIG. 2. This permits the roller free movement from side to side within the above noted narrow limits, and thereby helps the device of this invention to more easily accommodate and override irregularities in trolley systems that have been the victims of extremely hard use or abuse, without jamming and causing a back-up.

In practice, to accomplish limited, lateral moveability of a roller, the center opening 8 of roller 3' of FIG. 4, for example, may be fashioned just slightly larger than the cross sectional diameter of hook 1, so that the roller may be slipped over hook means 1, positioned at the point shown for roller 3', then, instead of spot welding (4') the roller permanently to hook 1, two spot welds or swedges 9, as shown in FIG. 2 at the position of roller 3', are effected. This procedure may be followed for one, two or all three rollers so that they have the freedom to move laterally in response to contour irregularities encountered by this device as it rolls along a trolley.

From FIG. 2, it will be noted there are angles $\alpha$ and $\alpha'$. Respectively, these are the angles between the plane of rotation of rollers 3 and 3', and between rollers 3" and 3'. As noted above axis 5' is essentially vertical, and angles $\alpha$ and $\alpha'$ may be within the range of 30° to 89°, though they will preferably range from 50° to 80°.

From the foregoing discussion, it will be apparent that all three rollers provide continuing, pure rolling contact with a trolley bar, regardless of the degree of sway encountered. However, central roller 3' serves yet another purpose. When a switch ramp, as disclosed in the '814 patent referred to above, is lowered onto a trolley bar, the centrally disposed roller 3' is essential to negotiate the lip of said ramp; without it, there would be a tendency to hang up, or jamb, at the switch.

Attention is directed to upwardly projecting spur 6 shown in FIG. 2. When going from a high ceiling storage area to a lower ceiling truck, a lower portion of the rope-sling, with its garments, can be lifted, and hung from spur 6, to thereby keep the garments at the lower end of the sling off the truck floor. Too, a protective shroud can be slipped up over the hung garments, and hung on spur 6 via grommeted openings. As will be seen, spur 6 is essentially an upwardly projecting vestige of closed loop 7. By "closed" loop is meant that spur 6 is tightly disposed against device 2, as best shown in FIG. 3. This prevents rope sling 10 from being dislodged and lost when jolted in use, or when a number of these devices are thrown into a bin for shipment back to a point of origin.

As will be readily observed from FIG. 2, the main frame of this invention, or rope gang-sling hook support 2, including upwardly projecting spur 6, closed loop 7 and hook means 1 at its upper end, is of one-piece, unitary construction fashioned from a single piece of stock having an essentially circular cross section.

As is well known in this field, the device of this invention is subjected to rough usage day after day, being transferred from storage trolley facilities to truck mounted trolleys, then transferred from the truck trolley to trolley storage at the destination, etc. Because of the neat, compact and sturdy unitary construction of the instant "loop and hook" (items 6 and 7), it is virtually impossible, through normal handling, to damage the hook-spur feature of the instant invention.

Spur 6 also performs the important secondary function of preventing the device of this invention from being jolted off a trolley bar, by acting as a stop to prevent upward and lateral disengagement. That is, in the absence of spur 6, as will be readily seen from FIG. 2, a jolt sending this device straight up, would cause sloping section 11 to hit the trolley bar, which section 11 would thereby tend to function as a cam to disengage this device from the trolley bar laterally, while at the peak of its upward movement, dropping it, and its load, on a truck floor.

As to the criticality of the diameter of rollers 3, 3' and 3", if it is too small, the rollers cannot survive the stresses placed on them by the weight of the rope-sling, with its hanger-hung garments, due to jostling and swaying of their heavy load in transfer and shipment. Conversely, if the rollers are too large in diameter, with respect to the diameter of member 2, they become far more susceptible to stress leverage in that their centers are so far removed from the point of stress, that they are more easily damaged in transfer and transit, thereby causing malfunction, with its attendant delays, expenses of repair, etc. Furthermore, if the rollers are too large they will tend to be so heavy, they will literally fall off a hanger bar if the rope-sling is empty and essentially weightless.

I claim:

1. In a two-ended garment hanger, rope gang-sling hook support, having means for engaging and retaining said gang-sling at its lower end, open arcuate hook means at its upper end for hanging the combined assembly from either a trolley or hanger bar, the improvement comprising three low-friction rollers disposed in fixed position on said hook means and rotatable about the linear axis thereof, one of said rollers being centrally located and having a plane of rotation that is essentially vertical when said device is in its normal position of repose, said first mentioned roller flanked on either side by a second and third roller respectively, each of said second and third roller having a plane of rotation, with respect to that of said first mentioned roller, lying within the range of 30° and 89°, all of said rollers positioned to be in substantially constant contact with said trolley or hanger bar, the plane of rotation of each of said three rollers being essentially normal to a tangent of said trolley or hanger bar cross section, occurring at the point of contact therewith of each of said three rollers, the instant device being devoid of any structure extending above the top surface of the centrally disposed roller, said means for engaging and retaining said rope gang-sling is a loop having an overlapping spur projecting generally upwardly, the curved arc segment of said arcuate hook means for hanging the assembly from a trolley or hanger bar is concentric with the cross section of said trolley or hanger bar when in operative juxtaposition, the rope gang-sling hook support, including said upwardly projecting spur and said hook means at its upper end, is of one-piece, unitary construction, and is fashioned from a piece of stock having an essentially circular cross section.

2. The device of claim 1 wherein each of said rollers has a substantially flat rolling surface, and said circular cross section has a minimum diameter of 5 mm.

3. In a two-ended garment hanger, rope gang-sling hook support, having means for engaging and retaining said gang-sling at its lower end, open arcuate hook means at its upper end for hanging the combined assembly from either a trolley or hanger bar, the improvement comprising three low-friction roller disposed in fixed position on said hook means and rotatable about the linear axis thereof, one of said rollers being centrally located and having a plane of rotation that is essentially vertical when said device is in its normal position of repose, said first mentioned roller flanked on either side by a second and third roller respectively, each of said second and third rollers having a plane of rotation, with respect to that of said first mentioned roller, lying within the range of 30° and 89°, all of said rollers positioned to be in substantially constant contact with said trolley or hanger bar, the plane of rotation of each of said three rollers being essentially normal to a tangent of said trolley or hanger bar cross section, occurring at the point of contact therewith of each of said three rollers, at least one of said rollers being laterally slideable within its fixed positioned over a range of from about 0.0 mm to about 9.0 mm, the instant device being devoid of any structure extending above the top surface of the centrally disposed roller, said means for engaging and retaining said rope gang-sling is a closed loop having an overlapping spur projecting generally upwardly, the curved arc segment of said arcuate hook means for hanging the assembly from a trolley or hanger bar is essentially concentric with the cross section of said trolley or hanger bar when in operative juxtaposition, the rope gang-sling hook support, including said upwardly projecting spur and said hook means at its upper end, is of one-piece, unitary construction, and is fashioned from a piece of stock having an essentially circular cross section.

4. The device of claim 3 wherein each of said rollers has a substantially flat rolling surface, and said circular cross section has a minimum diameter of 5 mm.

* * * * *